(12) United States Patent  
Choi

(10) Patent No.: US 7,789,362 B2
(45) Date of Patent: Sep. 7, 2010

(54) STAND FOR IMAGE DISPLAY DEVICE

(75) Inventor: Chi Young Choi, Gumi-shi (KR)

(73) Assignee: LG Electronics Inc., Seoul (KR)

( * ) Notice: Subject to any disclaimer, the term of this patent is extended or adjusted under 35 U.S.C. 154(b) by 1017 days.

(21) Appl. No.: 11/509,703

(22) Filed: Aug. 25, 2006

(65) Prior Publication Data

US 2007/0090233 A1 Apr. 26, 2007

(30) Foreign Application Priority Data

Oct. 6, 2005 (KR) .................. 10-2005-0094030

(51) Int. Cl.
*E04G 3/00* (2006.01)
(52) U.S. Cl. ............... 248/276.1; 248/918; 248/919; 248/921
(58) Field of Classification Search ................ 248/918, 248/919, 921, 922, 923, 121, 276.1; 361/679.27, 361/679.21, 679.55, 679.06, 679.07; 348/839
See application file for complete search history.

(56) References Cited

U.S. PATENT DOCUMENTS

| 4,438,458 | A | | 3/1984 | Münscher | 358/254 |
| 5,383,138 | A | * | 1/1995 | Motoyama et al. | 361/679.27 |
| 6,354,552 | B1 | | 3/2002 | Chiu | 248/422 |
| 6,581,893 | B1 | | 6/2003 | Lu | 248/291.1 |
| 6,595,481 | B1 | | 7/2003 | Huang et al. | 248/349.1 |
| 6,886,701 | B2 | * | 5/2005 | Hong et al. | 211/99 |
| 7,431,254 | B2 | * | 10/2008 | Cheng | 248/292.12 |
| 7,448,581 | B2 | * | 11/2008 | Lim et al. | 248/176.3 |
| 7,593,218 | B2 | * | 9/2009 | Hwang et al. | 361/679.21 |
| 2001/0055196 | A1 | | 12/2001 | Anzai et al. | 361/681 |
| 2002/0140875 | A1 | | 10/2002 | Ho | 348/839 |
| 2004/0165344 | A1 | | 8/2004 | Lee | 361/681 |
| 2005/0002159 | A1 | * | 1/2005 | Jeong | 361/683 |

FOREIGN PATENT DOCUMENTS

| TW | 404638 B | 9/2000 |
| TW | 472224 B | 1/2002 |

OTHER PUBLICATIONS

European Search Report dated Apr. 6, 2009.
Chinese Office Action dated Aug. 7, 2009.

* cited by examiner

*Primary Examiner*—Gwendolyn Baxter
(74) *Attorney, Agent, or Firm*—KED & Associates, LLP

(57) ABSTRACT

A stand for an image display device includes a supporting member that can support an image display device, a rear base is rotatably connected to the supporting member, and a front base that is connected to the rear base. The front base is rotatable with respect to the rear base in the same direction as the rear base is rotatable with respect to the supporting member such that the front base is foldable to a rear side of the image display device.

12 Claims, 14 Drawing Sheets

STAND FOR IMAGE DISPLAY DEVICE

BACKGROUND OF THE INVENTION

1. Field of the Invention

The present invention relates to a stand for an image display device. More particularly, the invention relates to a stand for an image display device that can be unfolded to support the image display device on a support surface, and that can be folded when the image display device is packed to maximize the number of image display devices that can be packed into the same containing space.

2. Description of the Related Art

Generally, an image display device, such as a plasma display panel (PDP) and a liquid crystal display (LCD) device, includes a stand installed on a bottom portion of the display for placing the image display device on a floor. Such a stand includes a supporting unit fixed to the bottom portion of the image display device, and a base unit connected to the supporting unit for being placed on a floor.

Over the last few years, the typical screen size of image display devices has become larger, and the thickness of the image display devices has become smaller in order to satisfy user's demands. As the image display device becomes larger and thinner, it becomes more important to prevent the image display device from falling forward when the image display device is placed on a floor. To accomplish this, the stand of the image display device should have a wide bottom surface to prevent the image display device from falling forward.

However, if a stand with a wide bottom surface is fixedly installed on the image display device, the packing size of the image display device increases. Therefore, the number of image display devices that can be packed into the same containing space is decreased. This larger container size costs the manufactures and sellers much more to transport and distribute the image display devices. If the bottom surface of the stand is reduced, to increase the number of packed image display devices that can be contained in the same space, the image display device may easily fall down when the image display device is place on a floor. This threatens the safety of customers and lowers the product stability.

To solve this problem, some related art image display devices have a stand that is separated from the display device for packing. However, it is inconvenient for users to mount the stand on the image display device before installing the image display device on a floor.

SUMMARY OF THE INVENTION

Accordingly, the present invention is directed to a stand for an image display device that substantially obviates one or more problems due to limitations and disadvantages of the related art.

An object of the present invention is to provide a stand for an image display device, having a wide bottom surface to prevent the image display device from falling down when the image display device is placed on a floor.

Another object of the present invention is to provide a stand for an image display device, that is designed to have a wide bottom surface and be folded to a back of the image display device when the image display device is packed for shipping, so as to increase the number of image display devices that can be packed into the same containing space.

A further another object of the present invention is to provide a stand for an image display device that is designed to be easily folded and unfolded for the convenience of users.

To achieve these objects and other advantages and in accordance with the purpose of the invention, as embodied and broadly described herein, a stand for an image display device embodying the invention includes a supporting member supporting the image display device; a rear base that is rotatably connected to the supporting member and that supports the image display device with respect to a support surface; and a front base that is connected to the rear base and that is rotatable with respect to the rear base in the same direction as the rear base is rotatable with respect to the supporting member. This allows the front base to be foldable to a side of the image display device. The image display device may also include a fixing part provided between the front base and the rear base to fix the front base relative to the rear base.

In another embodiment of the invention a stand for an image display device includes a supporting member supporting the image display device; a base unit that is rotatably connected to the supporting member through a first hinge unit and that supports the image display device with respect to a support surface; and a locker provided in the first hinge unit for preventing rotation of the first hinge unit when the image display device is in a standing position.

In a still another embodiment of the present invention, a stand for an image display device includes a supporting member supporting the image display device; a rear base rotatably connected to the supporting member through a first hinge unit and supporting the image display device with respect to a support surface; and a front base connected to the rear base through a second hinge unit. A frictional amount that resists rotation of the first hinge unit is set to be lower than a frictional amount that resists rotation of the second hinge unit such that as the stand is folded, the rear base rotates with respect to the supporting unit before the front base rotates with respect to the rear base.

In embodiments of the present invention, the bottom surface of the stand is wide, and the bottom surface of the stand can be folded to a position adjacent the rear surface of the image display device when the image display device is packed. This allows more image display devices to be packed into the same containing space as compared to related art devices.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
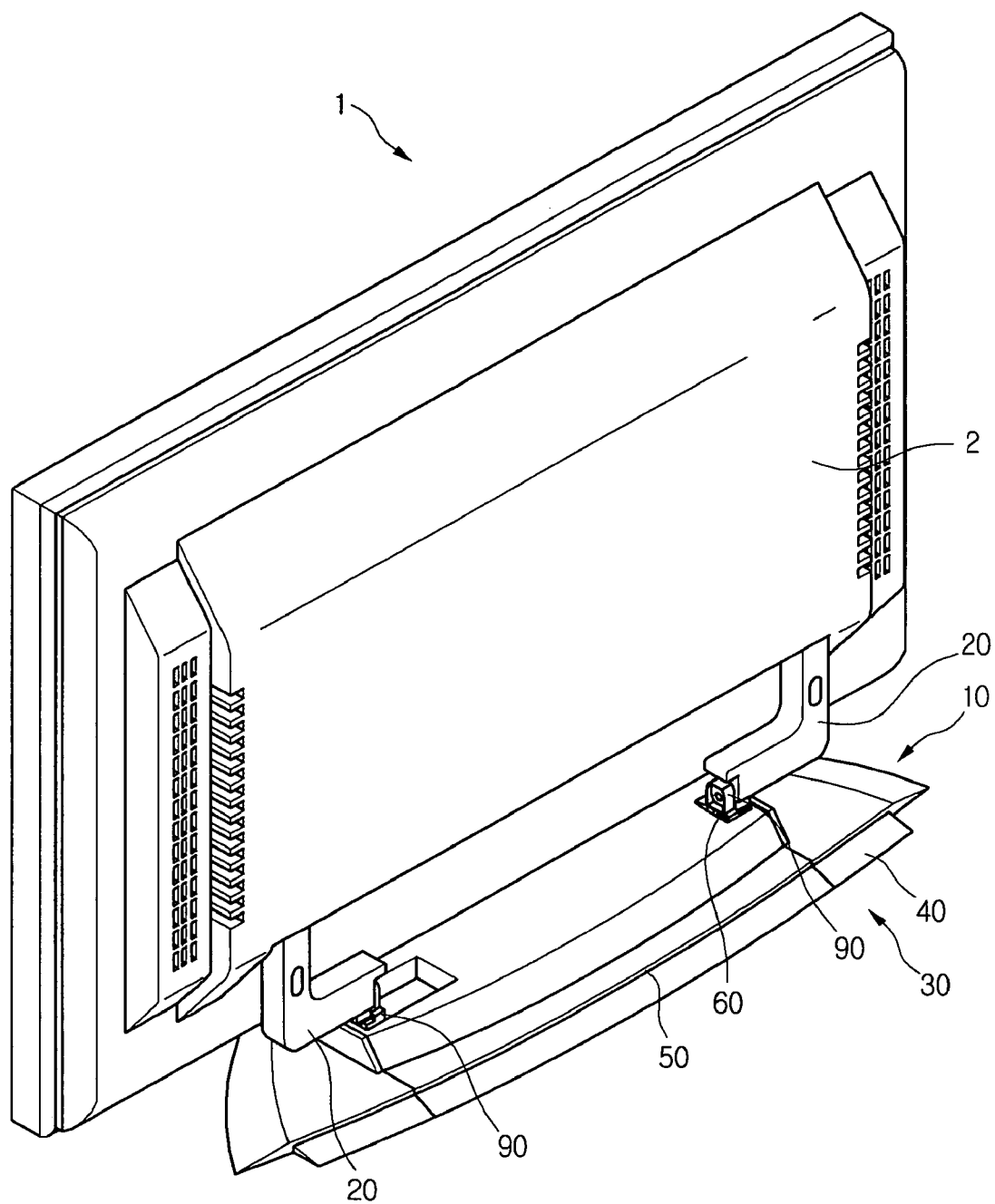
FIG. 1 is a perspective view showing a stand installed on an image display device according to the present invention.
Figure 2:
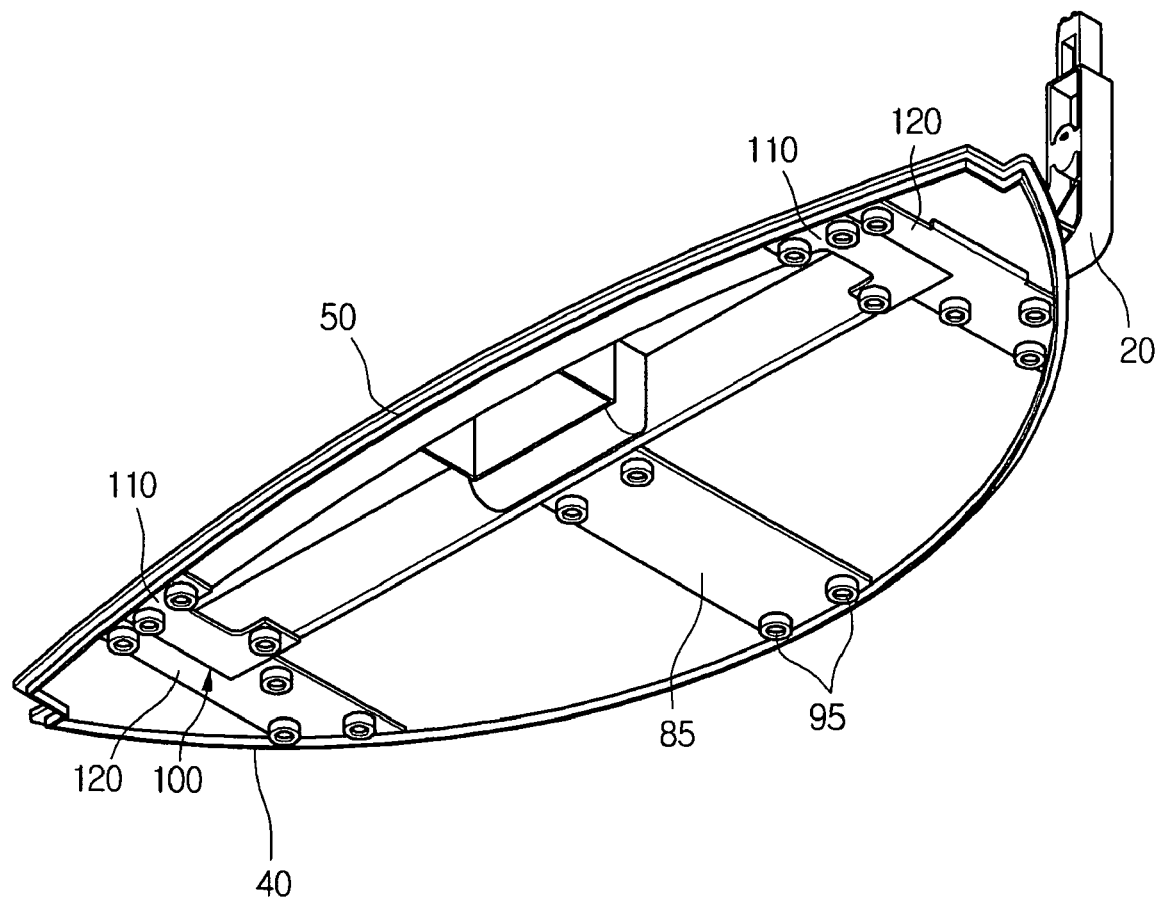
FIG. 2 is a bottom perspective view of a stand for an image display device according to the present invention.

FIG. 1 is a rear perspective view showing a stand 10 for an image display device 1 according to the present invention, and FIG. 2 is a bottom perspective view of the stand 10 for the image display device 1 according to the present invention.

Referring to FIGS. 1 and 2, the stand 10 of the present invention for the image display device 1 is installed on a bottom portion of a back cover 2 of the image display device 1. In detail, the stand 10 includes a supporting unit 20 fixed to the bottom portion of the back cover 2 of the image display device 1, a first hinge unit 90 rotatably connected with the supporting arm 20, and a base unit 30 coupled with the first hinge unit 90 for rotation with respect to the supporting unit 20.

The supporting unit 20 includes a pair of L-shaped supporting members fixed to the bottom portion of the back cover 2 of the image display device 1 at both sides of the bottom portion. The supporting unit 20 has one end fixed to the bottom portion of the back cover 2 and the other end on which the first hinge unit 90 is rotatably installed. The first hinge unit 90 is rotatably installed on the supporting unit 20 and extends downwardly. The first hinge unit 90 includes a locker 60 therein for locking the first hinge unit 90 with respect the supporting unit 20. The bottom of the first hinge unit 90 is fixed to the base unit 30 placed on a floor.

The base unit 30 includes a rear base 50 at a back side for preventing the image display device 1 from falling down in a backward direction, and a front base 40 at a front side for preventing the image display device 1 from falling down in forward direction. When the image display device 1 is fixed to the base unit 30, the gravity center of the image display device 1 lies approximately on the center of the base unit 30.

Referring to FIG. 2, the front base 40 is located in front of the image display device 1. The rear base 50 is located at the back of the image display device 1. Three sides of the rear base 50 are surrounded by the front base 40. Further, a rear end of the front base 40 is approximately parallel with a front end of the rear base 50.

The front base 40 is rotatable with respect to the rear base 50 by a second hinge unit 100. In detail, a rear base connecting unit 110 is fixed to a bottom of the rear base 50, and a front base connecting unit 120 is fixed to a bottom of the front base 40. The rear base connecting unit 110 and the front base connecting unit 120 are rotatably coupled with each other by the second hinge unit 100. The second hinge unit 100 will be more fully described later.

Meanwhile, a bottom support 85 with a rectangular plate shape is installed on a bottom center of the front base 40. A plurality of resting members 95 are installed on the bottoms of the bottom support 85, the front base connecting unit 120, and the rear base connecting unit 110. When the stand 10 is placed on a floor, the resting members 95 allow the stand 10 to cling to the floor. Preferably, the resting members 95 may be formed of an elastic material such as rubber.

Figure 3:
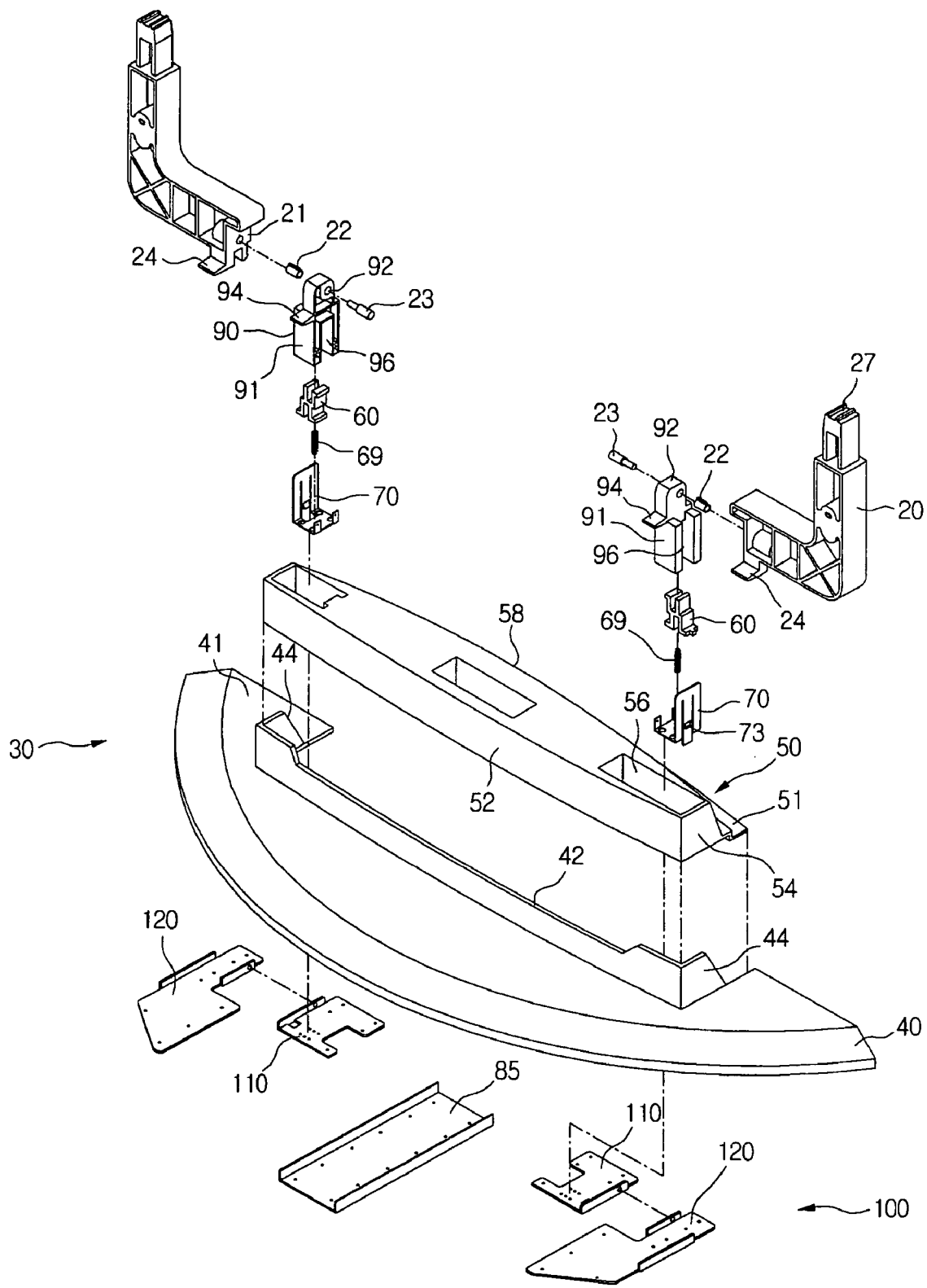
FIG. 3 is an exploded perspective view of a stand for an image display device according to the present invention.
Figure 4:
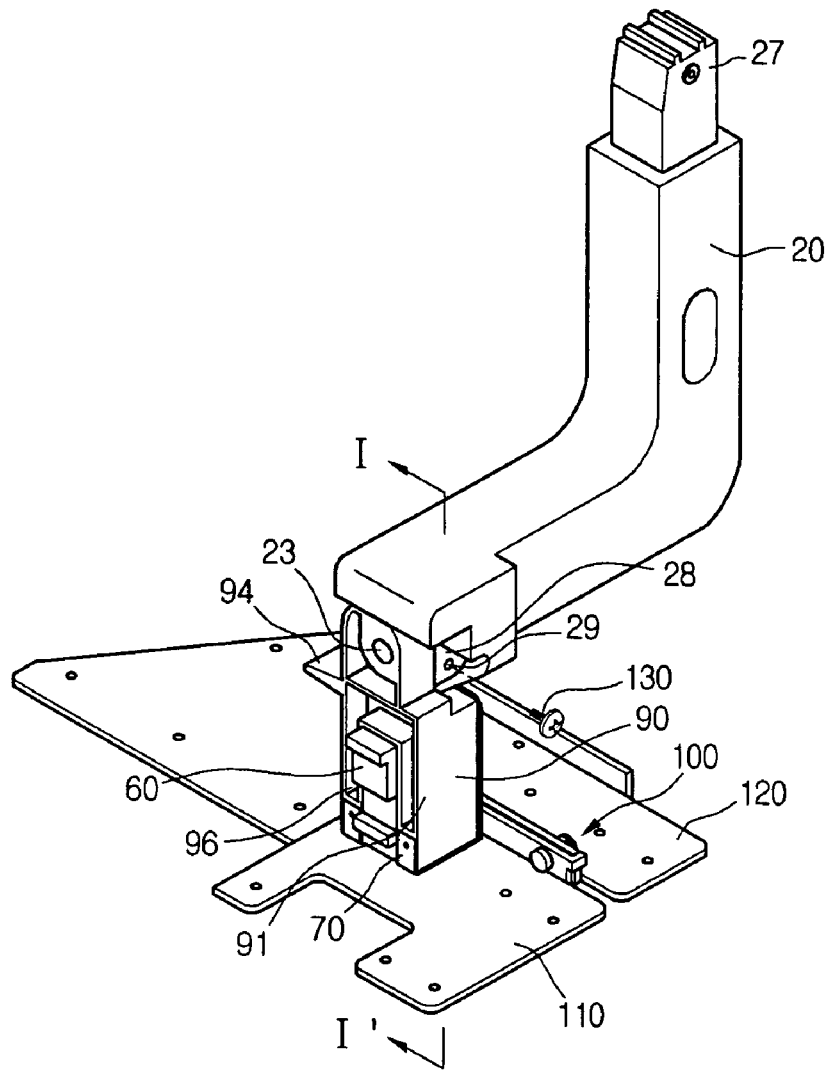
FIG. 4 is an assembled perspective view of a hinge unit of a stand for an image display device according to the present invention.

FIG. 3 is an exploded perspective view of the stand 10 according to the present invention, and FIG. 4 is an assembled perspective view of the first hinge unit 90 and the second hinge unit 100 of the stand 10 according to the present invention.

Referring to FIG. 3, the stand 10 includes the supporting unit 20 to be fixed to a lower portion of the back cover 2 of the image display device 1, the first hinge unit 90 rotatably coupled to the supporting unit 20, a rear base 50 fixed to the first hinge unit 20 for resting on a floor, and the front base 40 rotatably connected with the rear base 50 in front of the rear base 50.

In detail, the supporting unit 20 is disposed above the base unit 30 and includes the pair of L-shaped supporting members that face each other. The supporting unit 20 includes a rear fixing part 27 at an upper end for fitting into the lower portion of the back cover 2 of the image display device 1. The supporting unit 20 further includes a hinge hole 21 in a lower inner end. The hinge hole 21 is coupled with a first hinge shaft 23.

The first hinge unit 90 is rotatably coupled to the first hinge shaft 23. The first hinge unit 90 includes a rotary member 91 rotatably coupled to the first hinge shaft 23. The rotary member 91 defines a hinge hole 92 in an upper portion to receive the first hinge shaft 23.

A friction spring 22 is disposed in the hinge hole 92 to exert a frictional force when the first hinge shaft 23 and the rotary member 91 rotate. The rotary member 91 is designed to rotate only in one direction. In other words, the rotary member is designed so that the bottom end of the rotary member can only rotate towards the rear of the image display device, as will be explained in more detail later.

The hinge hole 92 of the rotary member 91 defined in the upper portion of the rotary member 91 is located at a predetermined distance from a center of the upper portion. An upper end edge of the rotary member 91 has an approximately vertical front edge in a forward direction of the image display device 1 and a curved back edge in a backward direction of the back cover 2 of the image display device 1. This ensures that the bottom portion of the rotary member 91 can only rotate towards the rear of the display device.

Referring to FIG. 4, the rotary member 91 is disposed at an inner side of the supporting unit 20, and the lower end of the supporting unit 20 is positioned close to the upper portion of the rotary member 91. Therefore, the rotary member 91 can be rotated up to about 90 degrees in a backward direction with respect to the supporting unit 20.

The supporting unit 20 includes a protrusion 24 on a lower end in a direction toward a front screen of the image display device 1. The rotary member 91 includes a protrusion 94 on an upper portion in a direction toward the front screen of the image display device 1. The protrusion 94 of the rotary member 91 is located beside the protrusion 24 of the supporting unit 20, and the protrusion 94 of the rotary member 91 becomes parallel with the protrusion 24 of the supporting unit 20 when the stand is erected on a floor.

When the stand 10 is erected, bottom surfaces of the protrusions 24 and 94 of the supporting unit 20 and the rotary member 91 make contact with a top surface of the base unit 30. Therefore, the image display device 1 can be prevented from falling down in a front direction by the contact between the protrusions 24 and 94 and the top surface of the base unit 30. In other words, the protrusions 24 and 94 of the supporting unit 20 and the rotary member 91, as rotation preventing stoppers, prevent the image display device 1 from falling down in a front direction.

Meanwhile, the rotary member 91 extends downward from the first hinge shaft 23, and it is formed with the locker accommodation portion 96 therein. The locker 60 is accommodated in the locker accommodation portion 96 to prevent the rotary member 91 from rotating with respect to the supporting unit 20.

In detail, the locker accommodation portion 96 is a space defined in a center portion of the rotary member 91 for accommodating the locker 60. A spring 69 is provided under the locker 60 to bias the locker 60 toward the supporting unit 20. A locker support 70, which is fixed to a lower end of the rotary member 91, supports the spring 69. By locking the locker 60 in the supporting unit 20, the first hinge unit 90 can be non-rotatably fixed to the supporting unit 20 when the stand 10 is installed on a floor. The structure and operation of the locker 60 will be more fully described later with reference to other drawings.

Referring to FIG. 4, the supporting unit 20 is formed with a screw coupling portion 28 on a rear end. The screw coupling portion 28 includes a threaded hole 29. A fastener such as a screw 130 may be coupled to the thread hole 29. Preferably, the screw 130 rests on the rotary member 91 at a portion of its head when the screw 130 is coupled with the screw coupling portion 28. In this way, since a portion of the fastener rests on the rotary member 91, rotation of the rotary member 91 can be prevented. Therefore, the supporting position of the rotary member 91 in the stand 10 can be maintained more stably. When the stand 10 of the present invention is installed on a floor, the stand 10 can be securely fixed without rotation by locking the rotary member 91 using the additional fastener such as the screw 130.

Meanwhile, the base unit 30 is disposed under the supporting unit 20. The base unit 30 includes the rear base 50 and the front base 40. As shown in FIGS. 1 and 2, the rear base 50 includes a bottom portion with a predetermined area extending in a backward direction of the image display device 1 in order to prevent the image display device 1 from falling down in the backward direction. Further, the front base 40 includes a bottom portion with a predetermined area extending in a forward direction of the image display device 1 in order to prevent the image display device from falling down in the forward direction.

In detail, referring to FIG. 3, the rear base 50 includes a horizontal portion 51 extending in the backward direction of the image display device 1 for increasing a contact surface between the bottom of the rear base 50 and a floor. Extension portions 52 and 54 are located in front of the horizontal portion 51 and formed with penetration holes 56 therein for receiving the first hinge units 90 therethrough.

The extension portions 52 and 54 include a front extension portion 52 facing toward the front of the image display device 1 and having a laterally wide shape, and side extension portions 54 having predetermined widths and extending backward from both sides of the front extension portion 52. A rear extension portion 58 extends between rear ends of the side extension portions 54 and faces the front extension portion 52.

The rear base connecting unit 110 is coupled to the bottom of the rear base 50 as shown in FIG. 2. The rear base connecting unit 110 is formed of a thin plate material with a " ⊏ "-shape. The rear base connecting unit 110 defines a plurality of holes therein in a matrix form. The rear base connecting unit 110 can be coupled to the rotary member 91 and the rear base 50, respectively, by inserting fasteners such as screws through the holes. In other words, the rotary member 91 and the rear base 50 can be fixed with respect to each other by the rear base connecting unit 110. In this way, the rear base 50 is fixed to the rotary member 91, such that the rear base 50 can be rotated only in one direction with respect to the image display device 1, that is, in the backward direction of the image display device 1.

As mentioned above, since the first hinge unit 90 can be rotated up to about 90 degrees in the backward direction with respect to the supporting unit 20, the rear base 50 fixed to the first hinge unit 90 can also be rotated up to about 90 degrees in the backward direction with respect to the supporting unit 20.

Meanwhile, the front base 40 includes a horizontal portion 41 having an elliptical shape in a forward direction of the image display device 1 for increasing a contact surface between the bottom of the front base 40 and a floor. Extension portions 42 and 44 are located inside the horizontal portion 41 for making contact with the extension portions 52 and 54 when the stand 10 is installed on a floor.

In detail, the extension portions 42 and 44 include a front extension portion 42 and side extension portions 44. The front extension portions 42 have a laterally wide shape and face toward the front of the image display device 1. When the stand 10 is installed on a floor, the front extension portion 42 makes contact with a front surface of the front extension portion 52 of the rear base 50. The side extension portions 44 have predetermined widths and extend backward from both sides of the front extension portion 42. When the stand 10 is installed on a floor, the side extension portions 44 make contact with inner surfaces of the side extension portions 54 of the rear base 50.

The front base connecting unit 120 is coupled to the bottom of the front base 40 as shown in FIG. 2. The front base connecting unit 120 is formed of a thin plate material with an elongated L-shape. The front base connecting unit 120 defines a plurality of holes therein in a matrix form. The front base connecting unit 120 can be coupled to the front base 40 by inserting fasteners such as screws through the holes.

Figure 5:
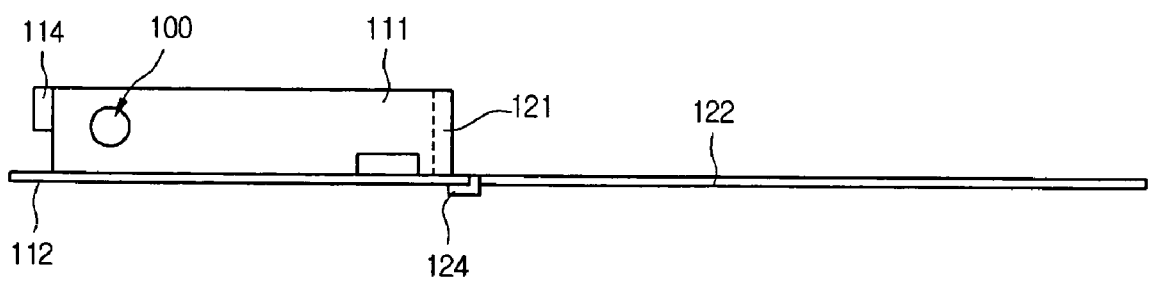
FIG. 5 is a front view showing a rear base connecting unit, a front base connecting unit, and a second hinge unit formed therebetween according to the present invention.
Figure 6:
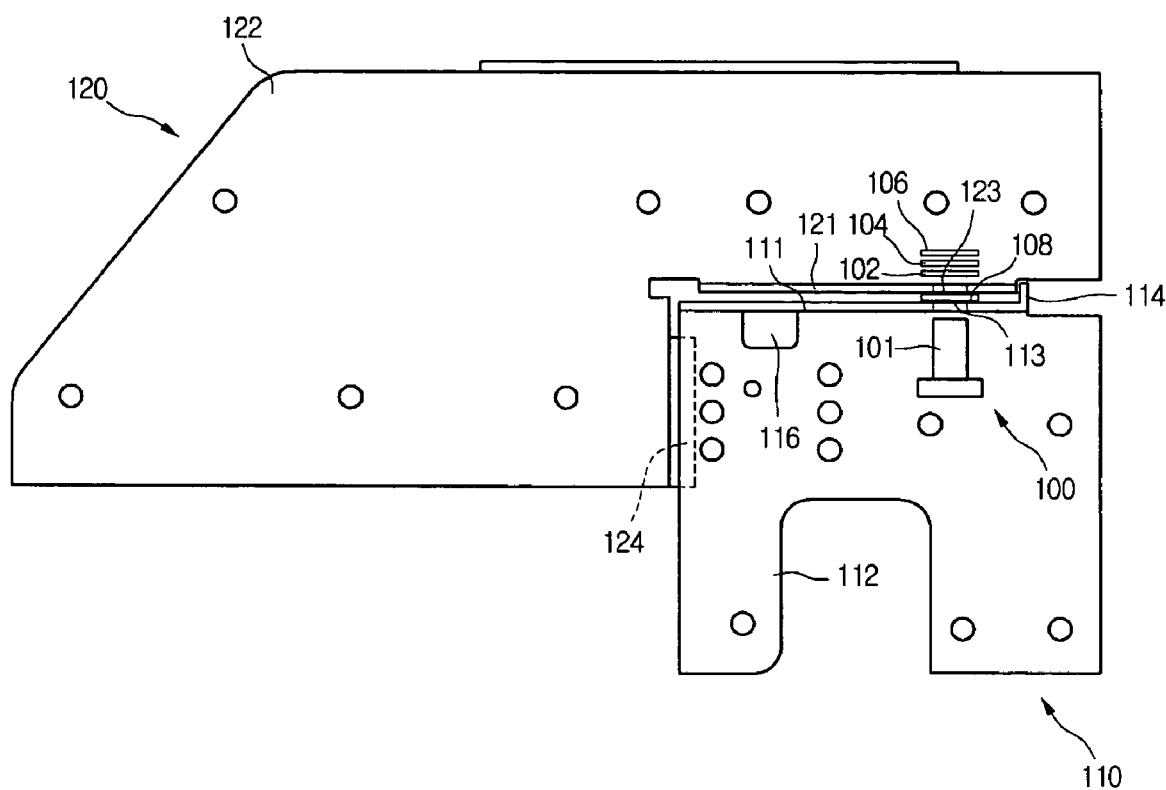
FIG. 6 is a plan view showing a rear base connecting unit and a front base connecting unit that are depicted in FIG. 4.

Meanwhile, the front base connecting unit 120 is disposed beside the rear base connecting unit 110, and the front base connecting unit 120 is rotatably coupled with the rear base connecting unit 110. FIG. 4 shows the front base connecting unit 120 and the rear base connecting unit 110 that are disposed side by side when the stand 10 is placed on a floor. FIG. 5 is a front view showing the rear base connecting unit 110, the front base connecting unit 120, and the second hinge unit 100 formed therebetween according to the present invention. FIG. 6 is a plan view showing the rear base connecting unit 110 and the front base connecting unit 120 that are depicted in FIG. 4. The structures of the rear base connecting unit 110, the front base connecting unit 120, and the second hinge unit 100 will now be more fully described with reference to FIGS. 4 to 6.

Referring to FIGS. 4 to 6, the second hinge unit 100 is formed between the rear base connecting unit 110 and the front base connecting unit 120. The rear base connecting unit 110 includes a " ⊏ "-shaped bottom surface 112 and a vertical surface 111 extending a predetermined length in an upward direction from an outer edge of the bottom surface 112. The vertical surface 111 defines a hinge shaft hole 113 in a predetermined portion to receive a hinge shaft 101. The bottom surface 112 defines a pusher penetration hole 116 in a predetermined portion, such that a pusher 78 (described later) of the a locking mechanism can be inserted through the hole 116 and protrude downward from the bottom surface 112.

The front base connecting unit 120 includes an L-shaped bottom surface 122 and a vertical surface 121. The vertical surface 121 extends a predetermined length in an upward direction from an inner edge of the bottom surface 122 and faces the vertical surface 111 of the rear base connecting unit 110. The vertical surface 121 of the front base connecting unit 120 defines a hinge shaft hole 123 at a corresponding position to the hinge shaft hole 113 defined in the vertical surface 111 of the rear base connecting unit 110.

The hinge shaft 101 is inserted through the hinge shaft holes 113 and 123 of the rear base connecting unit 110 and the front base connecting unit 120, and a plurality of washers 102, 104, and 106 are coupled to an end of the hinge shaft 101 to make up the second hinge unit 100. Further, a friction washer 108 is fitted around the hinge shaft 101 between the rear base connecting unit 110 and the front base connecting unit 120. The friction washer 108 exerts a frictional force on the rear base connecting unit 110 and the front base connecting unit 120 when the rear base connecting unit 110 and the front base connecting unit 120 are relatively rotated.

It is preferable that the frictional force of the second hinge unit 100 be larger than that of the first hinge unit 90. This relationship between the frictional forces of the first and second hinge units 90 and 100 influences the rotational order of the front base connecting unit 120 and the rear base connecting unit 110 when the base unit 30 is rotated. If the frictional force of the second hinge unit 100 is larger than that of the first hinge unit 90, the first hinge unit 90 is rotated before the second hinge unit 100 is rotated as the user folds the stand. Accordingly, as a user folds the stand, the front base 40 and the rear base 50 will rotate together to a position where the rear base 50 cannot rotate further. Then only the front base 40 is rotated individually with respect to the rear base 50 by rotation of the second hinge unit 100. The rotation of the base unit 30 will be more fully described later with reference to the other accompanying drawings.

When the stand is in the unfolded, erected position, the front base connecting unit 120 can be rotated in only one direction with respect to the rear base connecting unit 110. That is, the front base connecting unit 120 can only be rotated under the rear base connecting unit 110. If it were possible for the front base connecting unit 120 to be rotated over the rear base connecting unit 110 from a position where the front base 40 and the rear base 50 are positioned parallel with each, the image display device 1 would be able to fall down in a forward direction. For this reason, the front base connecting unit 120 is configured as described above.

The vertical surface 111 of the rear base connecting unit 110 includes a vertical rotation preventing part 114 on one end. The vertical rotation preventing part 114 extends vertically beside the vertical surface 121 of the front base connecting unit 120. Further, the bottom surface 122 of the front base connecting unit 120 includes a horizontal rotation preventing part 124 on an edge. The horizontal rotation preventing part 124 extends downward from the bottom surface 122 and bends toward the bottom surface 112 of the rear base connecting unit 110. The vertical and horizontal rotation preventing parts 114 and 124 function as stoppers for preventing the front base connecting unit 120 from rotating over the rear base connecting unit 110 from the position where the front base connecting unit 120 is positioned in parallel with the rear base connecting unit 110.

With this structure, the front base connecting unit 120 cannot be rotated over the rear base connecting unit 110 from the position parallel to the rear base connecting unit 110. However, the front base connecting unit 120 can be rotated about 180 degrees in one direction under the rear base connecting unit 110. Accordingly, in the stand 10 of the present invention, the rear base 50 can be rotated about 90 degrees with respect to the supporting unit 20, and the front base 40 can be rotated about 180 degrees with respect to the rear base 50.

As a result of this construction, the front base 40 and the rear base 50, which form the bottom surface of the base unit 30, can be rotated to positions parallel to the back cover 2 of the image display device 1. These rotations of the front base 40 and the rear base 50 can be referred to as a folding of the base unit 30 with respect to the image display device 1. The folding of the base unit 30 with respect to the image display device 1 will be more fully described later.

Figure 7:
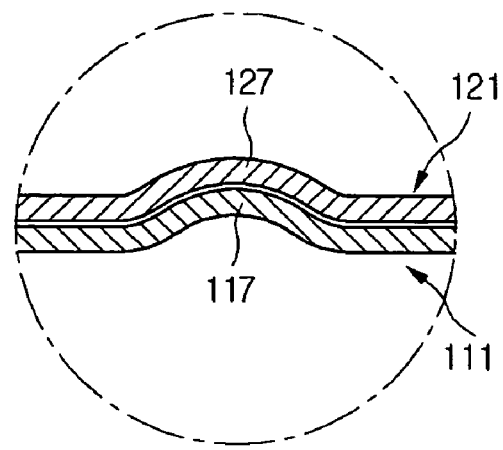
FIG. 7 is a sectional view showing a fixing part formed on a second hinge unit according to the present invention.

A fixing part can be provided for the rear base connecting unit 110 and the front base connecting unit 120 in order to prevent relative rotation of the front base 40 and the rear base 50 when the front base 40 and rear base 50 of the stand 10 are placed on a floor in parallel with each other. FIG. 7 shows an embodiment of the fixing part. Referring to FIG. 7, the vertical surface 111 of the rear base connecting unit 110 is formed with an embossed portion 117, and the vertical surface 121 of the front base connecting unit 120, which faces the vertical surface 111 of the rear base connecting unit 110, is formed with a corresponding concave portion 127. When the rear base 50 and the front base 40 are placed side by side in parallel with each other, the embossed portion 117 and the concave portion 127 are coupled with each other, such that the rear base 50 and the front base 40 can be placed on a floor in parallel with each other.

In this embodiment, the fixing part includes the embossed portion 117 and the concave portion 127 that are formed on the rear base connecting unit 110 and the front base connecting unit 120 for coupling with each other. However, as another embodiment, the rear base 50 can include a piece capable of rotating in a horizontal direction, and the front base 40 can define a groove in a corresponding portion. In this case, when the front base 40 and rear base 50 of the stand 10 are placed on a floor in parallel with each other, the rear base 50 and the front base 40 can be coupled with each other by horizontally rotating the piece of the rear base 50 into the groove of the front base 40. Those of skill in the art may change the fixing part into various forms without departing from the spirit and scope of the present invention.

Figure 8:
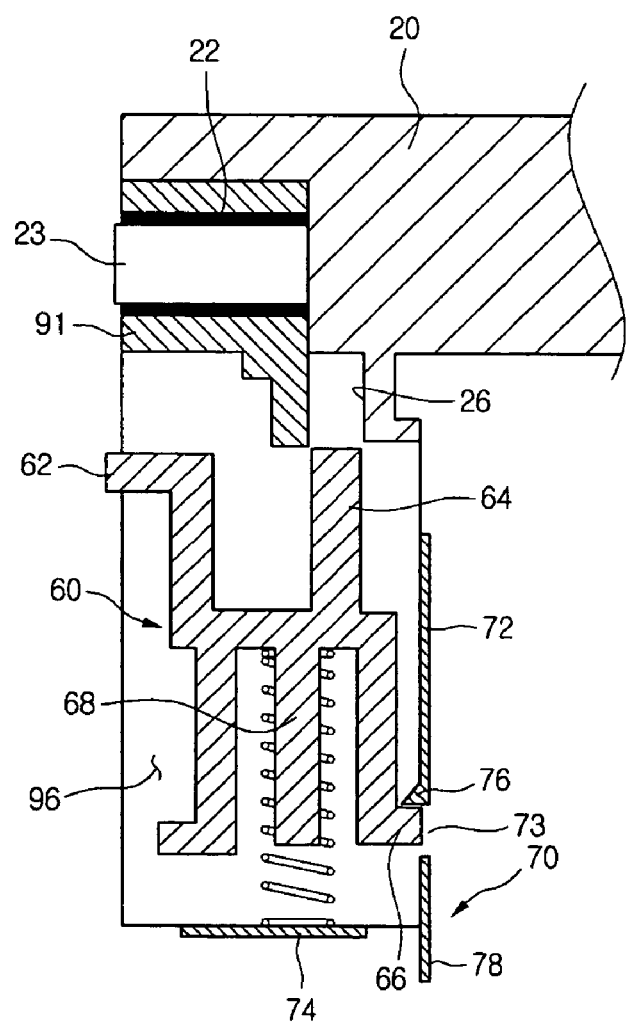
FIG. 8 is a sectional view taken along line I-I' of FIG. 4, showing an unlocked state of a locker according to the present invention.
Figure 9:
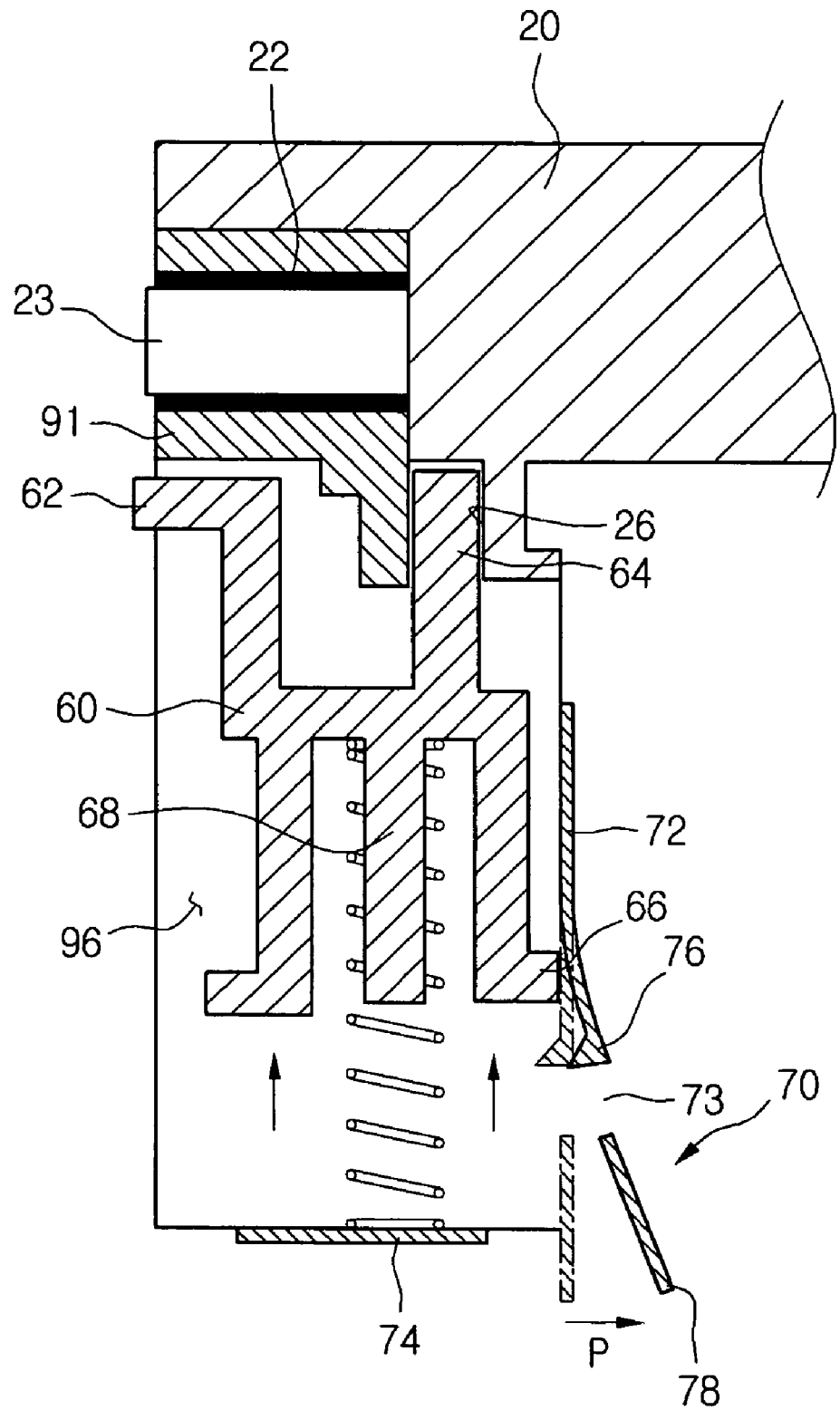
FIG. 9 shows a locked state of the locker depicted in FIG. 9.

As described above, the first hinge unit 90 includes a locking mechanism with a locker 60 to prevent rotation of the rotary member 91 with respect to the supporting member. Details of the locking mechanism will not be described with reference to FIGS. 8 and 9. FIG. 8 is a sectional view taken along line I-I' of FIG. 4, showing an unlocked state of the locker 60, and FIG. 9 shows a locked state of the locker 60 depicted in FIG. 9.

Referring to FIG. 8, the locker 60 includes a "⌐"-shaped handle 62 and a locking protrusion 64 extended from a center of the locker 60 toward the supporting unit 20. The locker 60 further includes a spring guide 68 extending downward under the locking protrusion 64 for guiding a spring. The locker 60 further includes a protruded stopper 66 on an outer end for being held by a stopping protrusion 76 of the locker support 70.

The spring 69 (see FIG. 3) is fitted around the spring guide 68. The spring 69 is supported by a spring supporting surface 74 of the locker support 70. The locker support 70 is formed of an L-shaped plate material. The locker support 70 includes a vertical surface 72 coupled to an outside of the rotary member 91 and the spring supporting surface 74 coupled to a bottom of the rotary member 91. A bottom of the spring supporting surface 74 is fixed to a top of the rear base connecting unit 110.

Meanwhile, referring to FIGS. 3 and 7, the vertical surface 72 of the locker support 70 is formed with the pusher 78 on a center portion. The pusher 78 bends from the center of the vertical surface 72 and extends along the length of the vertical surface 72, such that the pusher 78 can be elastically manipulated. When the spring supporting surface 74 is fixed to the top of the rear base connecting unit 110, the pusher 78 protrudes downward from the rear base connecting unit 110. The pusher 78 defines a rectangular hole 73 in an inside portion. A stopping protrusion 76 is protruded inwardly from an upper edge of the hole 73.

The supporting unit 20 includes a holding portion 26 in a bottom for receiving the locking protrusion 64. In the locked state, the locker 60 is moved towards the supporting unit 20 by the spring, and the locking protrusion 64 is held in the holding portion 26 of the supporting unit 20. The elastic force of the spring ensures that the locking protrusion is held in the holding portion 26 of the supporting unit 20.

When a user wants to fold the base unit 30 of the stand 10 to the back of the image display device 1, the locking mechanism is unlocked. The user would depress the locking handle 62 located at an inner top side of the rotary member 91. When the locking handle 62 is depressed, the locker 60 is moved down, against the bias of the spring, to a predetermined position where the stopper 66 of the locker 60 is held by the stopping protrusion 76 of the locker support 70. FIG. 8 shows this released state of the locking mechanism, where the stopper 66 of the locker 60 is held by the stopping protrusion 76 of the support 70. Therefore, a user can release the locker 60 only by depressing the locker handle 62 that is located at an inner side of the supporting unit 20 installed on the back of the image display device 1. When the stopper 66 is hooked on the stopping protrusion 76 by depressing the locker handle 62, the rotary member 91 can be rotated.

When the locking mechanism is to be changed from the released to the locked state, the pusher 78, which protrudes downward from the rear base 50, is pushed towards an outside direction P, as shown in FIG. 9. A free end of the pusher 78 is moved to the outside, and thus the stopping protrusion 76 is also moved to the outside. When the stopping protrusion 76 is moved to the outside in this way, the stopper 66 of the locker 60 is released from the stopping protrusion 76. Accordingly, the locker 60 is moved upward by the elastic force of the spring 69. When the locker 60 is moved upward in this way, the locking protrusion 64 of the locker 60 is held in the holding portion 26 of the supporting unit 20. The locking of the locker 60 is completed when the locking protrusion 64 is held in the holding portion 26 of the supporting unit 20, such that the rotary member 91 can be prevented from rotating with respect to the supporting member. Therefore, a user can lock the locker 60 only by pushing out the pusher 78 protruded from the bottom of the stand 10.

Since the locker 60 can be released and locked in these simple manipulations, users can conveniently use the stand 10 of the present invention.

The folding motion of the base unit 30 of the stand 10 will now be described according to the present invention. The base unit 10 is folded to minimize the packing size of the image display device 1 and the stand 10 when packing the image display device 1 into a packing container.

Figure 10:
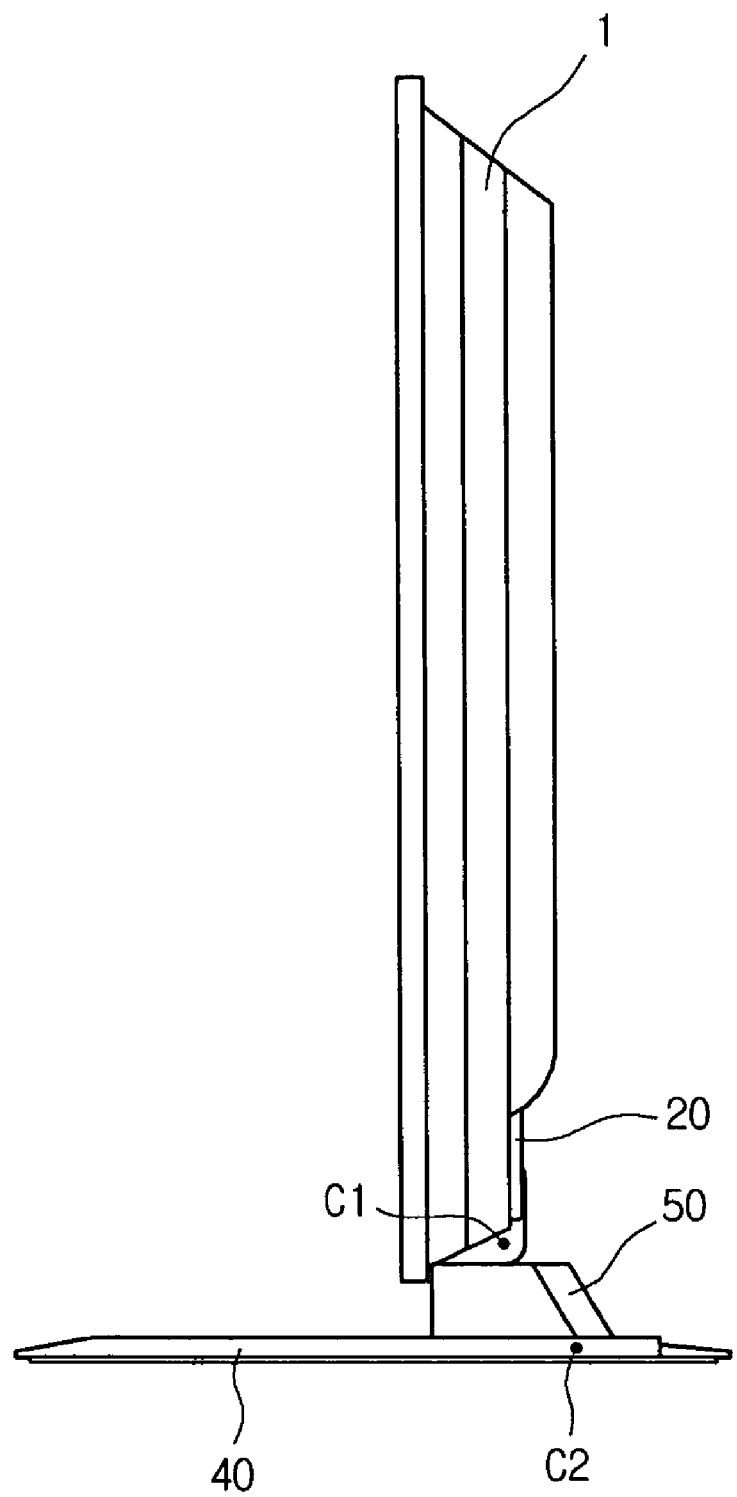
FIG. 10 is a side view showing a stand for an image display device according to the present invention.
Figure 11:
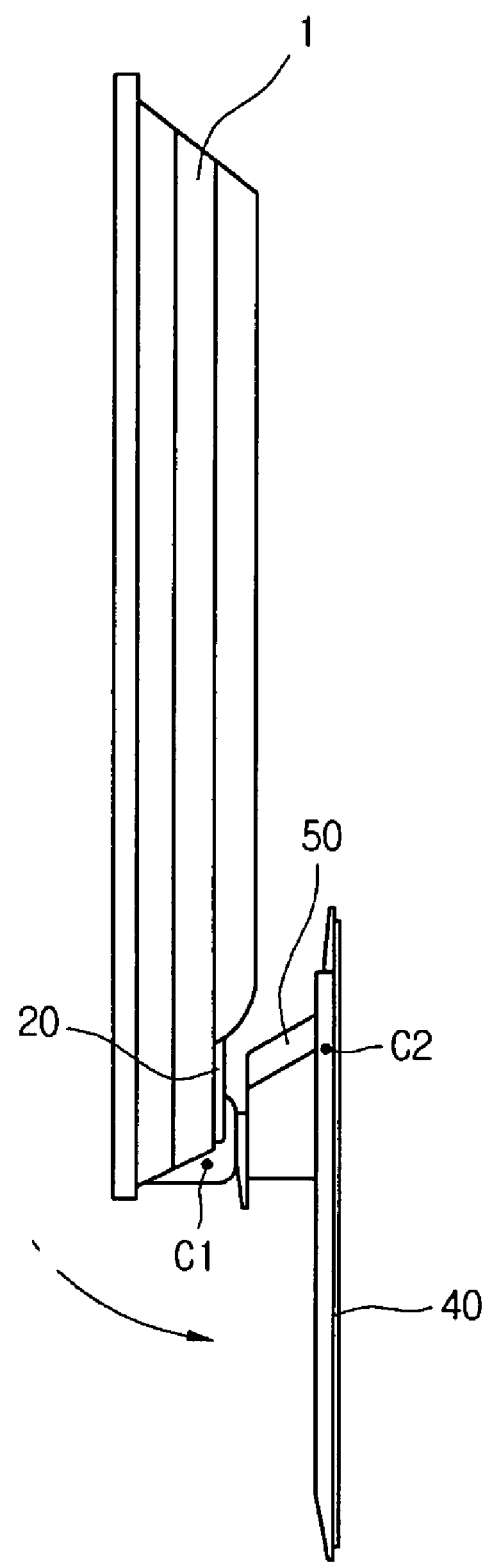
FIGS. 11 to 13 are side views sequentially showing a folding motion of a stand for an image display device according to the present invention.
Figure 12:
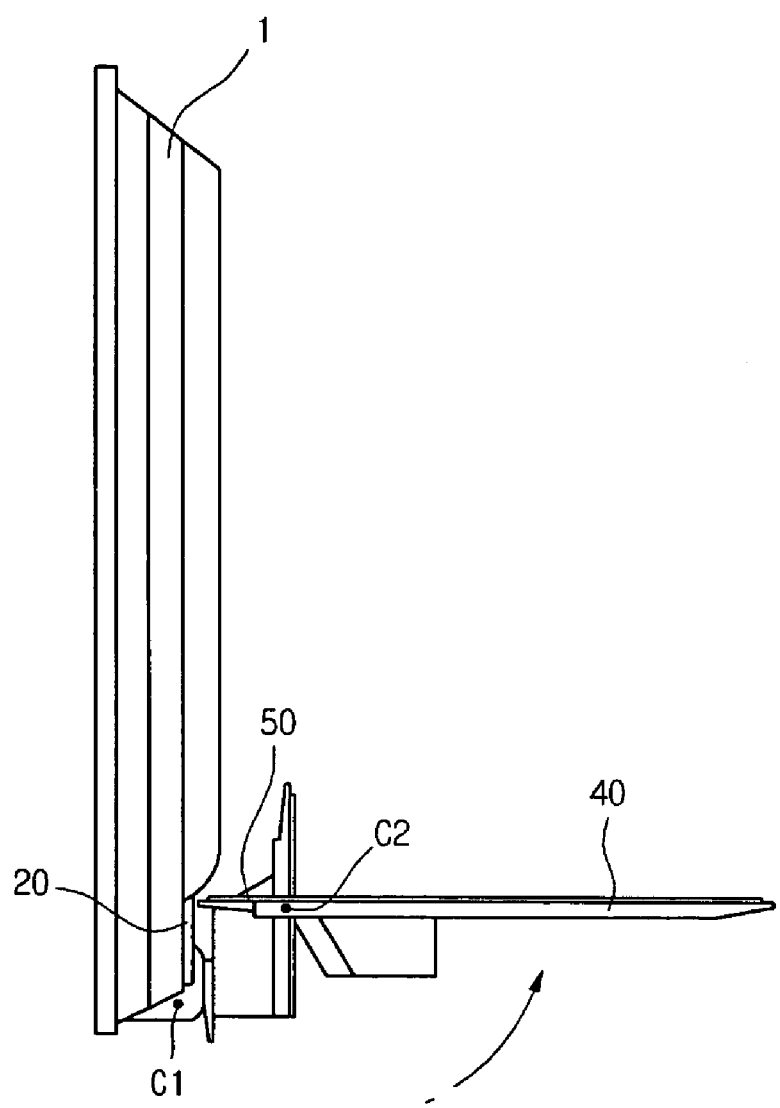
Figure 13:
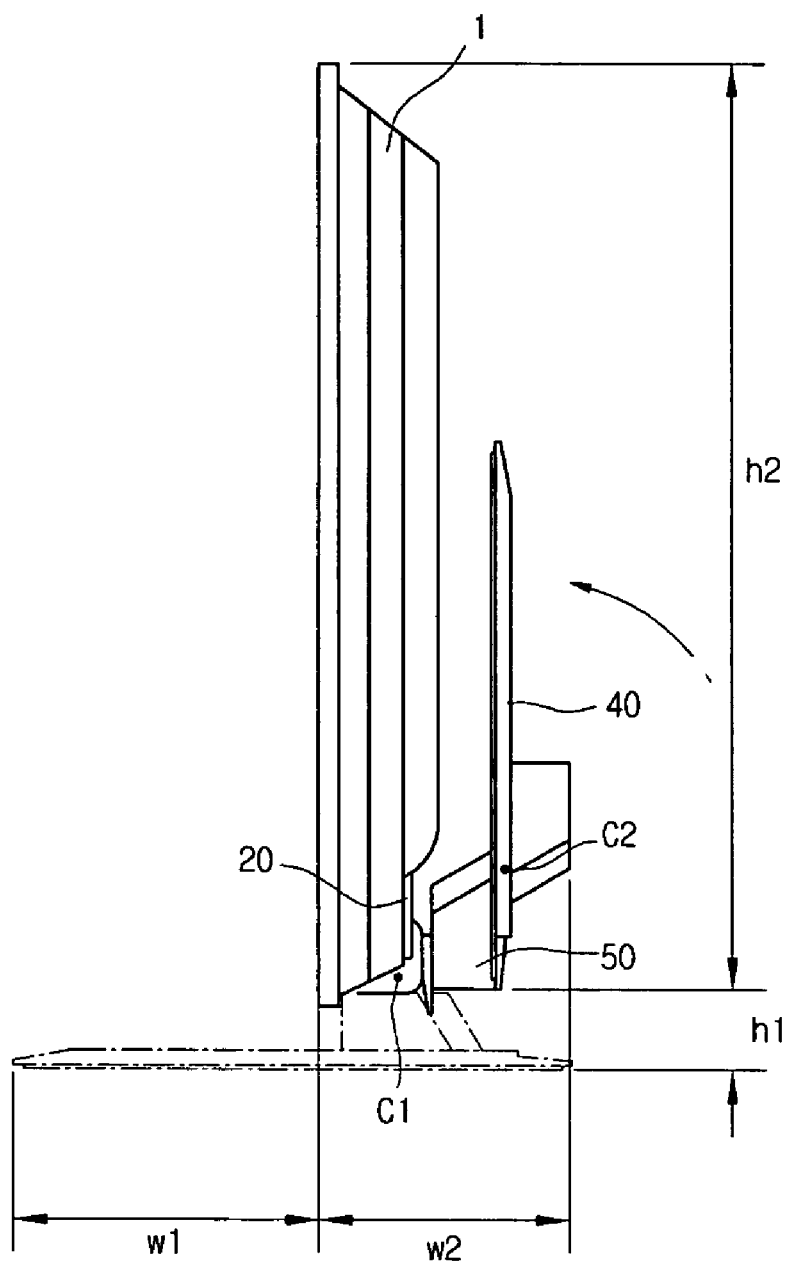

FIG. 10 is a side view showing the stand 10 placed on a floor. FIG. 11 is a side view showing the stand 10 when the base unit 30 of the stand is rotated 90 degrees on the first hinge unit 90. FIG. 12 is a side view showing the stand 10 when the front base 40 is rotated on the second hinge unit 100 by 90 degrees with respect to the rear base 50. FIG. 13 is a side view showing the stand 10 when the front base 40 is rotated on the second hinge unit 100 by 180 degrees with respect to the rear base 50, representing a completely folded position of the base unit 30.

In the drawings, the rotation axis of the first hinge unit 90 is denoted by C1, and the rotation axis of the second hinge unit 100 is denoted by C2. The base unit 30 of the stand 10 is sequentially rotated about C1 and C2.

When the stand 10 is placed on a support surface, as shown in FIG. 10, the locking mechanism of the rotary member 91 is locked such that the rotary member 91 cannot be rotated with respect to the supporting member. Further, a fastener such as the screw 130 can be coupled to the screw coupling portion 28 of the supporting unit 20 so as to prevent the rotation of the rotary member 91 more securely.

When it is intended to rotate the rotary member 91 that is locked in a dual manner, the screw 130 is released from the threaded hole 29 of the screw coupling portion 28 as a first step. Then, the locker handle 62 located on an inner side of the rotary member 91 is pressed downward to hook the stopper 66 on the stopping protrusion 76. In this way, when the stopper 66 is hooked on the stopping protrusion 76, the locking mechanism is released such that the base unit 30 can be rotated.

Here, referring to FIG. 11, the base unit 30 is rotated counterclockwise (when viewed in FIG. 11). In this rotation of the base unit 30, the front base 40 and the rear base 50 are rotated together by the rotation of the first hinge unit 90. As described above, since the frictional force of the second hinge unit 100 formed between the front base 40 and the rear base 50 is larger than the frictional force of the first hinge unit 90, the second hinge unit 100 is not rotated when the first hinge unit 90 is rotated. The first hinge unit 90 is rotated until the rear base 50 is rotated 90 degrees. After that, the rear base 50 is not rotated any more.

Then, the second hinge unit 100 is rotated such that the front base 40 is rotated with respect to the rear base 50. This rotation of the rear base 50 is shown in FIG. 12. As shown in FIG. 12, after the rear base 50 is rotated 90 degrees, the front base 40 is rotated counterclockwise with respect to the rear base 50. The counterclockwise rotation of the front base 40 continues until the front base 40 makes an angle of approximately 180 degrees with the rear base 50.

If the front base 40 is rotated more than 180 degrees with respect to the rear base 50, the top surface of the front base 40 comes into contact with the back cover 2 of the image display device 1. Therefore, when packing the image display device 1, it is preferable that the front base 40 be rotated to a position where the front base 40 is parallel with the back cover 2 of the image display device 1. When the rotations of the rear base 50 and the front base 40 are completed in this way, the folded state of the stand 10 can be obtained as shown in FIG. 13. In this state, the image display device 1 and the stand are packed into a packing container.

When the foldable stand 10 of the present invention shown in FIG. 13 is compared with the related art stand that can not be folded for packing the image display device, it can be understood that the width w1+w2 and height h1+h2 of the image display device 1 can be reduced by w1 and h1 when the image display device 1 is packed since the stand 10 of the present invention is folded to the back of the image display device 1. That is, the packing size of the image display device 1 can be remarkably reduced.

Figure 14:
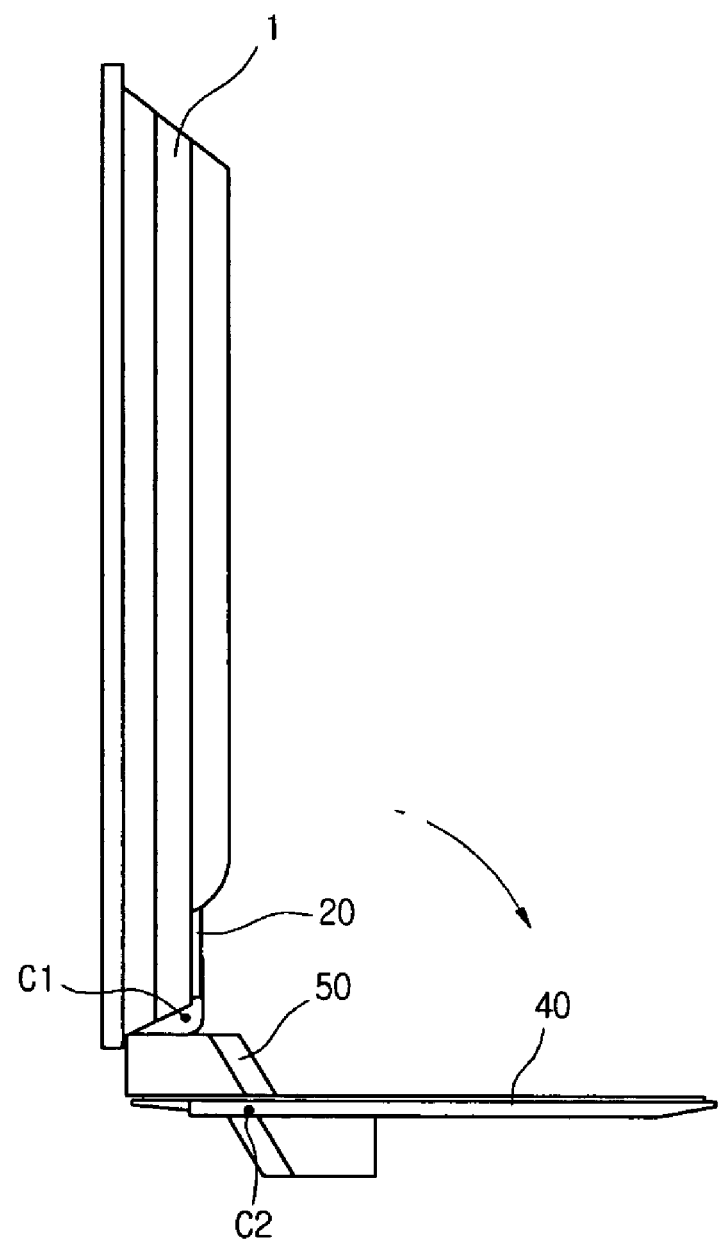
FIGS. 14 to 16 are side views sequentially showing an unfolding motion of a stand for an image display device according to the present invention.
Figure 15:
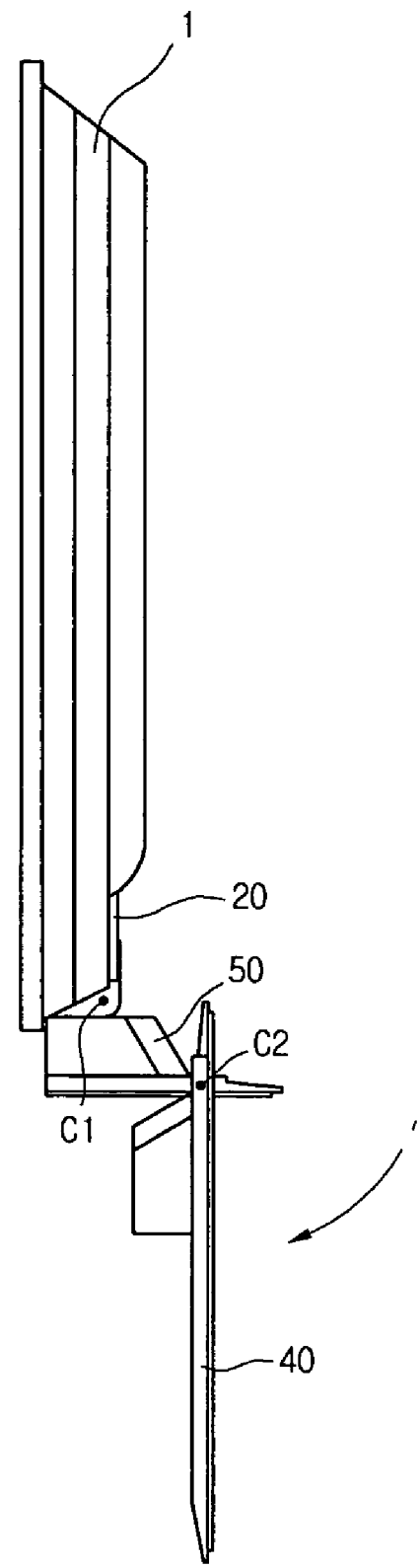
Figure 16:
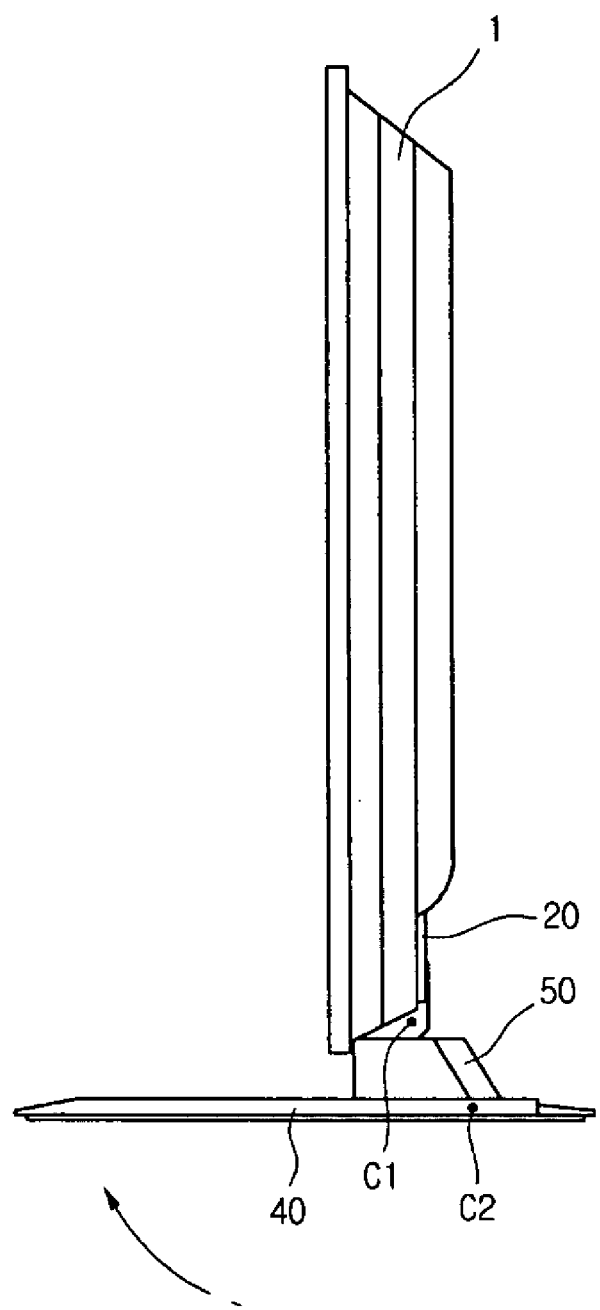

Procedures for placing the stand 10 on a floor after unfolding the base unit 30 of the stand 10 will now described with reference to FIGS. 14 to 16.

First, the folded front base 40 is rotated clockwise (when viewed in FIG. 13). As shown in FIG. 14, when the front base 40 is rotated in this way, the first hinge unit 90 is rotated prior to the second hinge unit 100. As described above, since the friction in the second hinge unit 100 is larger than that of the first hinge unit 90, the first hinge unit 90 is rotated prior to the second hinge unit 100. Therefore, the rear base 50 is rotated 90 degrees but the relative position between the rear base 50 and the front base 40 does not change.

After the rotation of the first hinge unit 90, rotation of the second hinge unit 100 starts. Accordingly, while the bottom of the rear base 50 faces downward without rotation, the front base 40 is rotated clockwise with respect to the rear base 50. The rotation of the front base 40 continues until the bottom of the front base 40 is placed on the same plane as the bottom of the rear base 50 as shown in FIG. 16. That is, the front base 40 is rotated until it is rotated 180 degrees with respect to the rear base 50. When the front base 40 is rotated forward by 180 degrees with respect to the rear base 50, the front base 40 is aligned with the rear base 50, and it is not rotated any more with respect to the rear base 50.

When the front base 40 and the rear base 50 are aligned in this way, a user can push the pusher 78 located inside the rear base connecting unit 110 in an outward direction of the image display device 1 to release the stopper 66 of the locker 60 from the stopping protrusion 76. Therefore, the locking protrusion 64 of the locker 60 is inserted into the holding portion 26 to prevent rotation of the first hinge unit 90.

After the locker 60 is placed into the locking position, the image display device 1 can be placed on a floor or another support surface. Then, a fastener such as the screw 130 can be fitted into the screw coupling portion 28 to prevent the rotation of the first hinge unit 90 more securely in addition to the locking action of the locker 60. In this way, the image display device 1 can be installed on a floor.

As described above, the stand for the image display is designed such that the bottom surfaces of the front base and the rear base are increased for stable contact with a floor. Therefore, the stability of the stand and the image display device can be improved.

Further, since the stand can be folded on the image display device when the image display device is packed, the packing size of the image display device can be minimized, thereby reducing transportation and physical distribution costs.

Furthermore, the base unit of the stand can be simply folded and unfolded, and the rotation of the base unit can be easily prevented through a simple locking structure.

In addition, the rotation of the first hinge unit can be prevented in a dual manner using the locker and the screw, thereby improving the safety of users.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for an image display device, comprising:
a supporting member configured to support an image display device;
a base unit rotatably connected to the supporting member through a first hinge unit and configured to support the supporting member; and
a locking mechanism configured to prevent rotation of the supporting member with respect to the base unit when the locking mechanism is in a locked position,
wherein the base unit includes a rear base rotatably connected to the supporting member through the first hinge unit and a front base rotatably connected to the rear base through a second hinge unit and rotatable with respect to the rear base in a same direction as the rear base is rotatable with respect to the supporting member,
wherein the locking mechanism includes an elastic member supported on the base unit, and a locker with a locking protrusion that is biased by an elastic member towards a position at which the locking protrusion engages with a holding portion of the supporting member, and
wherein the locker is accommodated in a locker accommodation portion formed on the first hinge unit.

2. The stand according to claim 1, wherein the locking mechanism further includes a locker support disposed on the rear base and configured to support the elastic member.

3. The stand according to claim 2, wherein the locker comprises a stopper that is configured to interact with a stopping protrusion of the locker support to hold the locker in a position at which the locking protrusion is disengaged from the holding portion of the supporting member, to thereby allow the base unit to rotate with respect to the supporting member.

4. The stand according to claim 2, wherein the locker comprises a handle configured to be pressed by a user to cause the locking protrusion to disengage from the holding portion.

5. The stand according to claim 4, wherein the locker support comprises:
a pusher having the stopping protrusion, wherein the pusher is elastically movable such that the stopping protrusion can be moved between an interference position and a release position; and
wherein the stopper is held by the stopping protrusion when the pusher is in the interference position, and wherein when the pusher is moved to the release position, the stopping protrusion releases the stopper so that the locker can be moved into a position at which the locking protrusion of the locker engages the holding portion of the supporting member.

6. The stand according to claim 1, wherein the front base is rotatably connected to opposite sides of the rear base.

7. The stand according to claim 1, wherein a frictional force acting when the rear base rotates with respect to the supporting member is smaller than a frictional force acting when the front base rotates with respect to the rear base.

8. The stand according to claim 1, further comprising:
a rear base connecting unit fixed to the rear base; and
a front base connecting unit fixed to the front base, wherein the front base connecting unit is rotatably connected with the rear base connecting unit.

9. The stand according to claim 8, further comprising a rotation control mechanism that is configured such that when the stand is in an erected position, the front base connecting unit can only rotate in one direction with respect to the rear base connecting unit.

10. The stand according to claim 1, further comprising a rotation preventing stopper configured to prevent the front base from rotating with respect to the rear base when the front base and the rear base are placed on a support surface.

11. An image display device comprising the stand of claim 1.

12. The stand according to claim 1, wherein the front base is rotatable approximately 180° with respect to the rear base so that a bottom surface of the front base is substantially parallel to a bottom surface of the rear base.

* * * * *